US011319154B1

(12) United States Patent
Kosik, Sr.

(10) Patent No.: US 11,319,154 B1
(45) Date of Patent: May 3, 2022

(54) MOTOR-DRIVEN ROLLER CONVEYOR ASSEMBLY CONSTRUCTION JIG AND A METHOD OF USING SAME

(71) Applicant: Richard R. Kosik, Sr., Hughestown, PA (US)

(72) Inventor: Richard R. Kosik, Sr., Hughestown, PA (US)

(73) Assignee: Itoh Denki USA Inc., Wilkes-Barre, PA (US)

( * ) Notice: Subject to any disclaimer, the term of this patent is extended or adjusted under 35 U.S.C. 154(b) by 0 days.

(21) Appl. No.: 17/164,870

(22) Filed: Feb. 2, 2021

(51) Int. Cl.
*B65G 13/06* (2006.01)
*B65G 13/11* (2006.01)

(52) U.S. Cl.
CPC .............. *B65G 13/06* (2013.01); *B65G 13/11* (2013.01)

(58) Field of Classification Search
CPC ........ B65G 13/00; B65G 13/02; B65G 13/04; B65G 13/07; B65G 13/071; B65G 13/06; B65G 13/11; B65G 13/12; B65G 39/12
USPC ........................................ 193/35 R; 198/788
See application file for complete search history.

(56) References Cited

U.S. PATENT DOCUMENTS

| | | | | |
|---|---|---|---|---|
| 6,112,875 A | * | 9/2000 | Gibson | B65G 13/00 193/35 R |
| 6,244,427 B1 | * | 6/2001 | Syverson | B65G 13/06 198/788 |
| 6,286,660 B1 | * | 9/2001 | Kalm | B65G 13/11 193/35 R |
| 6,702,091 B2 | * | 3/2004 | Nimmo | B65G 39/12 193/35 R |
| 7,213,701 B2 | * | 5/2007 | Deur | B65G 39/12 193/37 |
| 8,469,178 B2 | * | 6/2013 | Butler | B65G 47/766 198/457.06 |
| 8,973,744 B2 | * | 3/2015 | Thomas | B65G 13/12 198/861.2 |
| 2020/0140203 A1 | * | 5/2020 | Danelski | B65G 43/10 |

FOREIGN PATENT DOCUMENTS

WO       WO-0046133 A1 *  8/2000  ............ B65G 13/11

* cited by examiner

*Primary Examiner* — Mark A Deuble
(74) *Attorney, Agent, or Firm* — James R. McDaniel

(57) ABSTRACT

A roller conveyor assembly construction system, including a rotatable jig assembly, a plurality of aligner assemblies, wherein each of the plurality of aligner assemblies is operatively connected to the jig assembly, a plurality of rollers located on each of the plurality of aligner assemblies, and a frame assembly operatively connected to the plurality of rollers, wherein the frame assembly is removably connected to each of the plurality of aligner assemblies.

20 Claims, 17 Drawing Sheets

MOTOR-DRIVEN ROLLER CONVEYOR ASSEMBLY CONSTRUCTION JIG AND A METHOD OF USING SAME

FIELD OF THE INVENTION

The present invention is generally related to the construction of conveyor assemblies used to transport containers and packages throughout a facility such as a warehouse. More particularly, the present invention relates to a jig for use in constructing the conveyor assembly that includes a plurality of conveyor assembly sections. Each of the conveyor assembly sections includes a plurality of conveyor zones. Each conveyor zone includes a motor-driven roller that is operatively connected to a plurality of idler rollers. The jig provides for an effective and efficient way to construct each conveyor section.

BACKGROUND OF THE INVENTION

It is known that conveyor assemblies used to transport containers and packages throughout a facility such as a warehouse have employed a plurality of conveyor assembly sections that include a plurality of rollers. Furthermore, these rollers include a motor-driven roller operatively connected to a plurality of idler rollers. However, it requires a great amount of time and effort to construct a conveyor assembly section since each of the rollers must be properly aligned on the conveyor assembly section. Furthermore, each motor-driven roller must be properly connected to the idler rollers.

It is a purpose of this invention to fulfill these and other needs in the art of the construction of conveyor assemblies in a manner more apparent to the skilled artisan once given the following disclosure.

BRIEF SUMMARY OF THE INVENTION

A first aspect of the present invention is a roller conveyor assembly construction system, including a rotatable jig assembly, a plurality of aligner assemblies, wherein each of the plurality of aligner assemblies is operatively connected to the jig assembly, a plurality of rollers located on each of the plurality of aligner assemblies, and a frame assembly operatively connected to the plurality of rollers, wherein the frame assembly is removably connected to each of the plurality of aligner assemblies.

In one embodiment of the first aspect of the present invention, the rotatable jig assembly further includes a plurality of leg supports, a plurality of leg support braces, wherein each of the plurality of leg support braces is operatively connected to each of the plurality of leg supports, a jig extension operatively connected to each of the plurality of leg supports, a plurality of legs operatively connected to each of the plurality of leg supports and the jig extension, a rotatable axle operatively connected to the plurality of legs, a plurality of rotatable arms, wherein each of the plurality of rotatable arms is operatively connected to the rotatable axle, and a plurality of aligner retaining arms, wherein each of the plurality of aligner retaining arms is operatively connected to each of the plurality of arms and wherein each of the plurality of aligner retaining arms includes a plurality of slots located along a length of each of the plurality of aligner retaining arms.

In another embodiment of the first aspect of the present invention, the rotatable jig assembly further includes a plurality of arm length adjustors operatively connected to each of the plurality of arms, and a plurality of jig height adjustors, wherein each of the plurality of jig height adjustors is operatively connected to each of the plurality of legs.

In a further embodiment of the first aspect of the present invention, the rotatable jig assembly further includes a plurality of aligner retainers, wherein each of the plurality of aligner retainers is operatively connected to one of the plurality of slots.

In a still another embodiment of the first aspect of the present invention, each of the plurality of aligner assemblies further includes a plurality of aligner plates, wherein each of the aligner plates is located within one of the plurality of slots, and a plurality of hex-hole shaped slots located along a length of each of the plurality of aligner plates.

In yet another embodiment of the first aspect of the present invention, the plurality of rollers further includes a plurality of motor-driven rollers, and a plurality of idler rollers located adjacent to each of the plurality of motor-driven rollers.

In a still further embodiment of the first aspect of the present invention, the frame assembly further includes a plurality of frame rails, a plurality of frame stays, wherein each of the plurality of frame stays is operatively connected to each of the plurality of frame rails, and a plurality of hex-shaped openings located along a length of each of the plurality of frame rails.

A second aspect of the present invention is a method of constructing a roller conveyor assembly, including the steps of: providing a rotatable jig assembly; removably attaching a plurality of aligner assemblies to the jig assembly; placing a plurality of rollers on each of the plurality of aligner assemblies; and attaching a frame assembly to the plurality of rollers to form a roller conveyor assembly.

In another embodiment of the second aspect of the present invention, the step of providing the rotatable jig assembly further includes providing a plurality of leg supports, attaching a plurality of leg support braces to each of the plurality of leg supports, attaching a jig extension to each of the plurality of leg supports, attaching a plurality of legs to each of the plurality of leg supports, attaching a rotatable axle to the plurality of legs, attaching a plurality of rotatable arms to the rotatable axle, and attaching a plurality of aligner retaining arms to each of the plurality of arms, wherein each of the plurality of aligner retaining arms includes a plurality of slots located along a length of each of the plurality of aligner retaining arms.

In a further embodiment of the second aspect of the present invention, the step of providing the rotatable jig assembly further includes attaching a plurality of arm length adjustors to each of the plurality of arms, and attaching a plurality of jig height adjustors to each of the plurality of legs.

In a still another embodiment of the second aspect of the present invention, the step of providing the rotatable jig assembly further includes removably attaching each of a plurality of aligner retainers to each of the plurality of slots.

In a yet another embodiment of the second aspect of the present invention, the step of removably attaching a plurality of aligner assemblies to the jig assembly further includes placing a plurality of aligner plates within one of the plurality of slots, providing a plurality of hex-hole shaped slots located along a length of each of the plurality of aligner plates, and removably attaching each of the plurality of aligner retainers to each of the plurality of aligner plates.

In still further embodiment of the second aspect of the present invention, the step of placing a plurality of rollers on each of the plurality of aligner assemblies further includes placing a plurality of motor-driven rollers on the plurality of aligner plates, wherein each of the plurality of motor-driven rollers is located within one of the plurality of hex-hole shaped slots, and placing a plurality of idler rollers on the plurality of aligner plates, wherein each of the plurality of idler rollers is located within one of the plurality of hex-hole shaped slots, and wherein a predetermined number of the plurality of idler rollers are located adjacent to each of the plurality of motor-driven rollers.

In an even further embodiment of the second aspect of the present invention, the step of attaching a frame assembly to the plurality of rollers further includes providing a plurality of frame rails, attaching a plurality of frame stays to each of the plurality of frame rails, and providing a plurality of hex-shaped openings along a length of each of the plurality of frame rails.

In another embodiment of the second aspect of the present invention, the method further includes locating the frame assembly over the plurality of rollers and the plurality of aligner assemblies, and removably attaching the frame assembly to each of the plurality of aligner assemblies.

In a further embodiment of the second aspect of the present invention, the method further includes rotating the plurality of rotatable arms such that the plurality of aligner assemblies is separated from the frame assembly and the plurality of rollers, and securing the plurality of rollers to the frame assembly.

A third aspect of the present invention is an apparatus for constructing a motor-driven roller and idler roller conveyor section, including: a rotatable jig assembly; a plurality of aligner assemblies, wherein each of the plurality of aligner assemblies is operatively connected to the jig assembly; a plurality of motor-driven rollers and idler rollers located on each of the plurality of aligner assemblies; and a frame assembly operatively connected to the plurality of motor-driven rollers and idler rollers, wherein the frame assembly is removably connected to each of the plurality of aligner assemblies.

In another embodiment of the third aspect of the present invention, the rotatable jig assembly further includes a plurality of leg supports, a plurality of leg support braces, wherein each of the plurality of leg support braces is operatively connected to each of the plurality of leg supports, a jig extension operatively connected to each of the plurality of leg supports, a plurality of legs operatively connected to each of the plurality of leg supports, a rotatable axle operatively connected to the plurality of legs, a plurality of rotatable arms, wherein each of the plurality of rotatable arms is operatively connected to the rotatable axle, a plurality of aligner retaining arms, wherein each of the plurality of aligner retaining arms is operatively connected to each of the plurality of arms and wherein each of the plurality of aligner retaining arms includes a plurality of slots located a length of each of the plurality of aligner retaining arms, and a plurality of aligner retainers, wherein each of the plurality of aligner retainers is operatively connected to one of the plurality of slots.

In a further embodiment of the third aspect of the present invention, each of the plurality of aligner assemblies further includes a plurality of aligner plates, wherein each of the aligner plates is located within one of the plurality of slots, and a plurality of hex-hole shaped slots located along a length of each of the plurality of aligner plates.

In yet another embodiment of the third aspect of the present invention, the frame assembly further includes a plurality of frame rails, a plurality of frame stays, wherein each of the plurality of frame stays is operatively connected to each of the plurality of frame rails, and a plurality of hex-shaped openings located along a length of each of the plurality of frame rails.

The preferred jig for use in constructing conveyor assemblies, according to various embodiments of the present invention, offers the following advantages: ease of use; decreased time to construct a conveyor assembly section; decreased time to construct a conveyor zone; ease of aligning the idler rollers in the side (frame) rails; ease of aligning the motor-driven roller in the side (frame) rails; ease of connecting the motor-driven roller to a plurality of idler rollers; ease of electrically connecting the power source to the motor-driven roller; the ability to connect the motor-driven roller to a communication system; and the ability to independently control conveyor assembly zones. In fact, in many of the preferred embodiments, these advantages are optimized to an extent that is considerably higher than heretofore achieved in prior, known methods of constructing conveyor assemblies.

BRIEF DESCRIPTION OF THE DRAWINGS

The above-mentioned features and steps of the invention and the manner of attaining them will become apparent, and the invention itself will be best understood by reference to the following description of the embodiments of the invention in conjunction with the accompanying drawings, wherein like characters represent like parts throughout the several views and in which.

DETAILED DESCRIPTION OF THE PREFERRED EMBODIMENTS OF THE INVENTION

Figure 1:
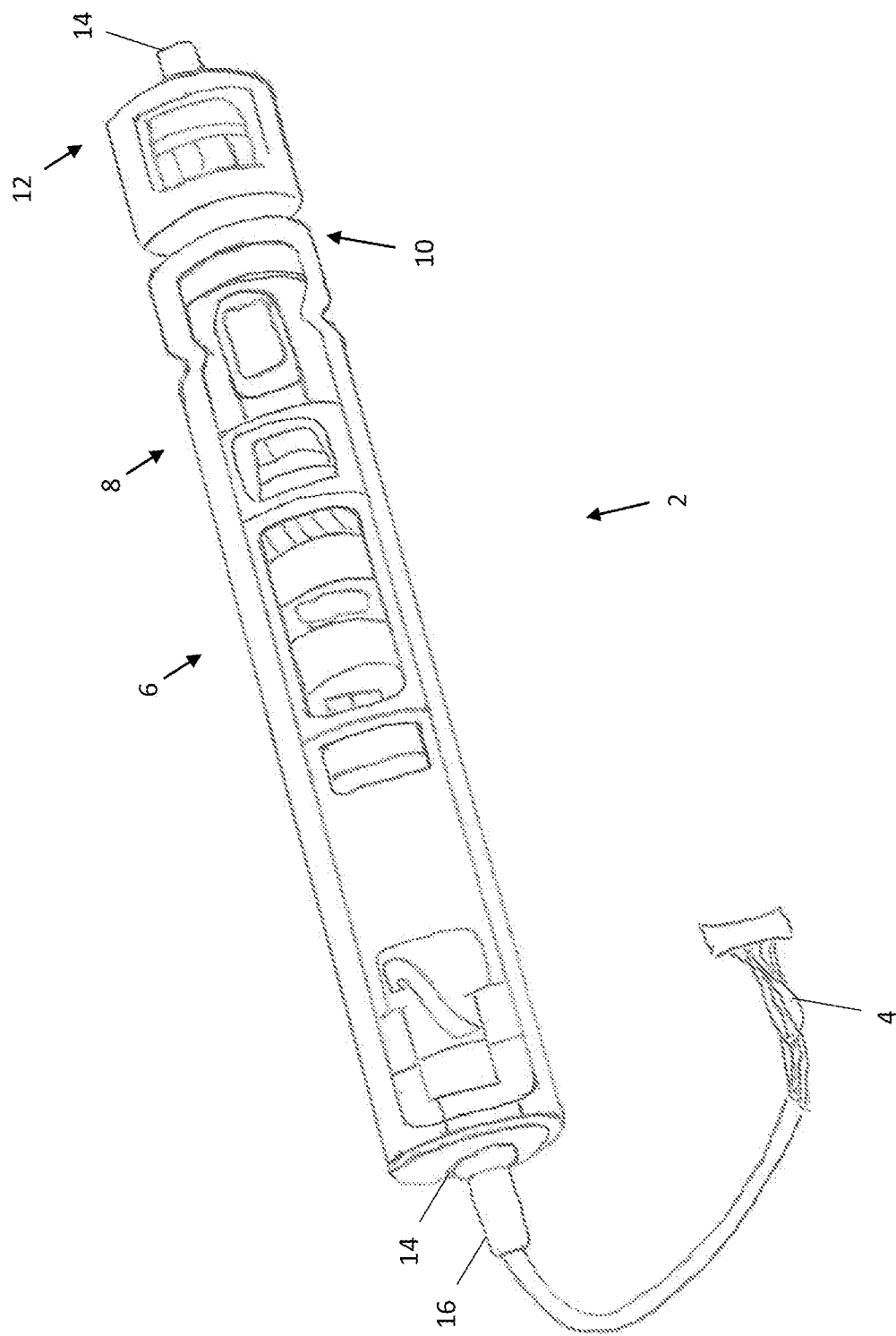
FIG. 1 is an isometric top view of a conventional motor-driven roller, constructed according to the prior art.

As discussed above, it is known to employ motor-driven rollers (MDRs) in conveyor assemblies. These MDRs can be operatively connected to a plurality of idler rollers in a conveyor assembly section. In this manner, the MDRs can be used to transport a container along the conveyor assembly section. As shown in FIG. 1, a conventional motor-driven roller 2, includes, in part, electrical/communication wiring 4, direct current (DC) motor 6, gearbox 8, torque transfer tube 10, spring loaded end cap 12, hex-shaped shaft end 14, electrical/communication wiring connector 16, and roller electrical/communication connector 18.

Figure 2:
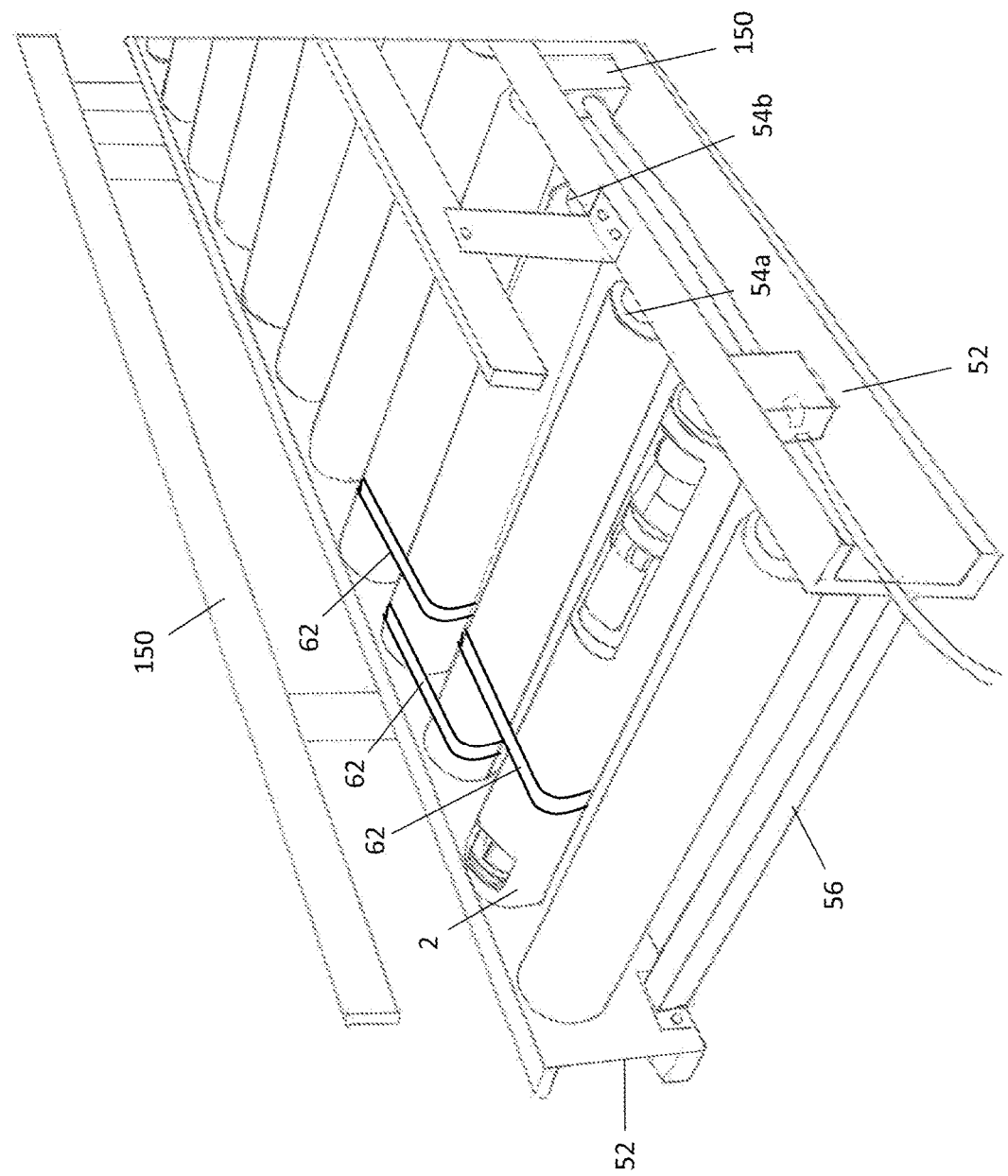
FIG. 2 is an isometric top view of a conventional conveyor section, constructed according to the prior art.

It is also known to employ the MDRs 2 as part of a conveyor assembly section. As shown in FIG. 2, a conventional conveyor assembly zone 50 includes, in part, motor-driven roller 2, idler rollers 54a and 54 b, frame stay 56, frame rail extensions 58, motor-driven roller electrical/communication controller assembly 150, and round urethane O-rings 62. It is to be understood that motor-driven roller electrical/communication controller assembly 150 can be used to provide power and communications such as internet, Wi-Fi, and other similar communications to MDR 2 so that each MDR 2 can be independently controlled in order to transport a container (not shown) along the conventional conveyor assembly zone 50. It is to be further understood that urethane O-rings 62 are located between rollers. For example, an O-ring 62 is operatively connected to MDR 2 and the adjacent idler roller 54a. Another O-ring 62 is operatively connected between idler roller 54a and idler roller 54b. Other O-rings 62 are connected to adjacent idler rollers. Typically, there are nine (9) idler rollers 54 and one (1) MDR 2 in a conventional conveyor assembly zone 50. In this manner, the rotation of the MDR 2 will cause the other nine (9) idler rollers to rotate in a particular conveyor assembly zone 50.

Figure 3:
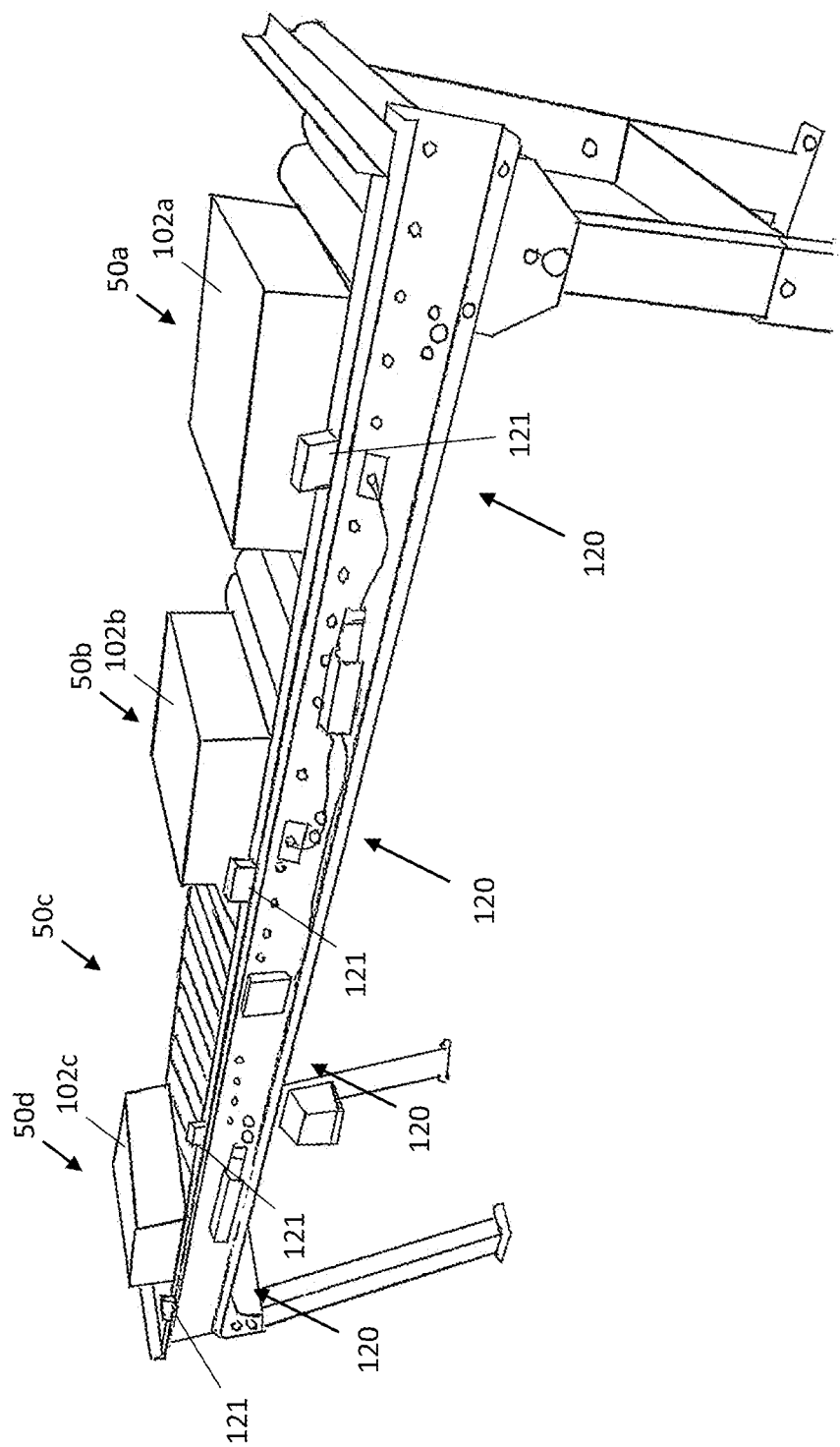
FIG. 3 is another isometric top view of a conventional conveyor section, constructed according to the prior art.

With respect to FIG. 3, there is illustrated a conventional conveyor assembly section 100. Typically, conveyor assembly section 100 includes four (4) conventional conveyor assembly zones 50a-50d. In this manner, each conventional conveyor assembly zone 50a-50d can independently transport a container along a portion of the conveyor assembly section 100. For example, conveyor assembly zone 50a can be used to transport a conventional container 102a along conveyor assembly zone 50a towards conveyor assembly zone 50b. Conveyor assembly zone 50b can be used to transport a conventional container 102b along conveyor assembly zone 50b towards conveyor assembly zone 50c. Finally, conveyor assembly zone 50d can be used to transport a conventional container 102c along conveyor assembly zone 50d towards another conveyor assembly section 100 (not shown).

One of the major shortcomings of the construction of the prior, known conveyor assembly zone 50 is that when constructing this type of conveyor, the MDR 2 needs to be inserted into the frame rails 52, while stretching the round urethane rings 62 that are needed to form the conveyor zone 50. The current method involves procuring the frame rails 52, attaching the frame rails 52 to the frame stays (cross members) 56, inserting the MDR 2 while protecting the motor cable/connection 4 (FIG. 1), all the while trying to make sure that the hex shaped shaft end 14 (FIG. 1) and hex-shaped roller electrical/communication connector 18 both fit into the hex shaped frame openings 104 (FIGS. 4 and 5) in frame rails 52. This is very time consuming because great care must be taken not to scratch the inside frame rail 52, while stretching the urethane round belt 62 to ensure proper drive transfer between MDR 2 and idler rollers 54 when completed. Typically, a putty knife (not shown) is used to help locate the hex shaped shaft end 14 in the hex shaped frame openings 104. However, this is only marginally effective since the hex shaft end 14 needs to be precisely positioned to meet the hex shaped frame opening 104. Following the insertion of the MDR 2 and the idler rollers 54, the MDR 2 needs to be secured to a mounting bracket 112 (FIG. 4) to prevent the motor shaft from spinning when in operation.

Figure 4:
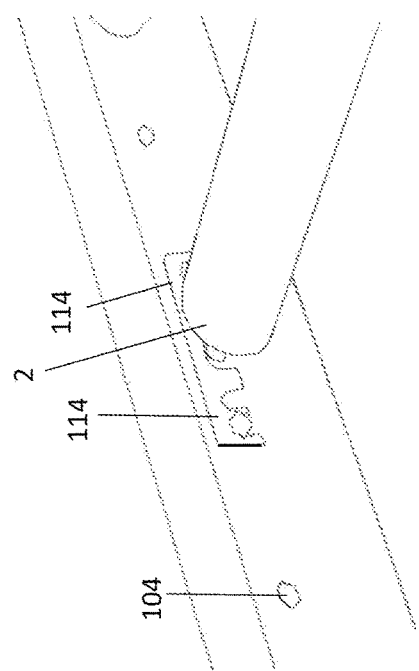
FIG. 4 is an isomeric top view of one end of the motor-driven roller being inserted in an opening in the frame rail, according to the prior art.
Figure 5:
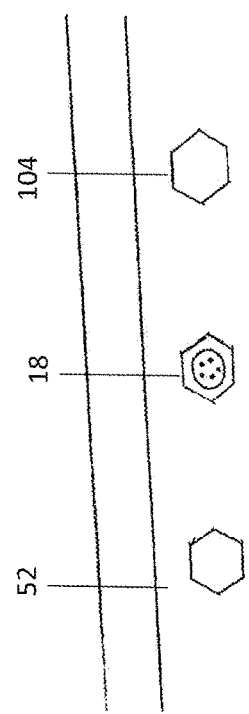
FIG. 5 is a side view of the frame rail showing the electrical connection end of the motor-driven roller extending out of an opening in the frame rail, constructed according to the prior art.

In order to more clearly demonstrate the problems associated with the prior method of constructing the known conveyor assembly zone 50, attention is directed to FIGS. 4 and 5. FIGS. 4 and 5 illustrate one end of the motor-driven roller 2 being inserted into an opening 104 in frame rail 52. Also, mounting bracket 112, is conventionally attached to the inside of one frame rail 52 by conventional fasteners 114. It is to be understood that mounting bracket 112 is used to prevent the hex-shaped roller electrical/communication connector 18 (FIG. 5) of motor-driven roller 2 from rotating within opening 104 and damaging the opening 104.

Figure 6:
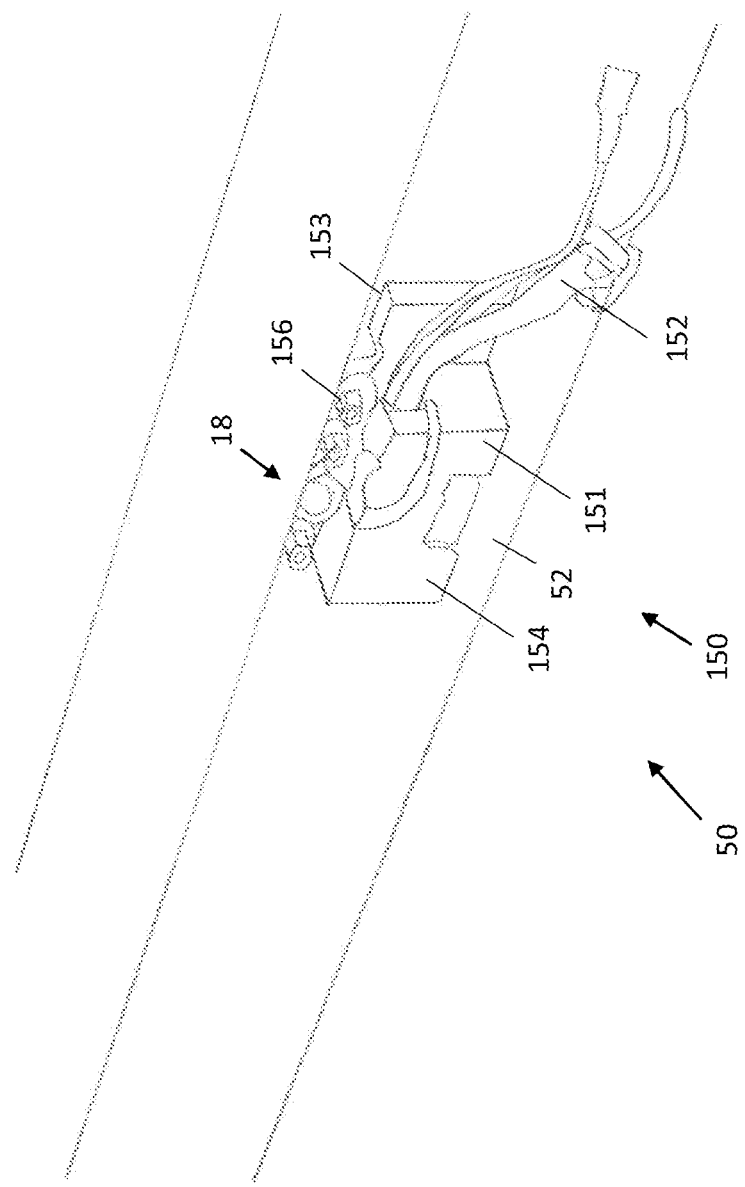
FIG. 6 is an isometric top view of the electronic controller being attached to the frame rail and the motor-driven roller, according to the prior art.

Regarding FIG. 6, there is illustrated electrical/communication controller assembly 150 being attached to one frame rail 52 and the motor-driven roller 2. Electrical/communication controller assembly 150 includes, in part, a conventional electrical/communication controller 151, controller electrical/communication wiring 152, controller mounting bracket 153, motor-driven roller fastener 154, and bracket fasteners 156. Preferably, controller mounting bracket 153, motor-driven roller fastener 154, and bracket fasteners 156 are constructed of any suitable, durable, high-strength, rust resistant material.

As can be seen in FIG. 6, controller mounting bracket 153 is located along a predetermined location of frame rail 52. As discussed above, preferably, there will be four (4) motor-driven rollers 2 attached to a conveyor assembly zone 50. Consequently, four (4) electrical/communication controller assemblies 150 will need to be attached along the frame rail 52 of a conveyor assembly zone 50. It is to be understood that electrical/communication wiring 4 is connected to electrical/communication controller 151. Given this background, each mounting bracket 153 is conventionally attached to frame rail 52 by conventional fasteners 156.

Also, motor-driven roller 2 is conventionally attached to mounting bracket by conventional fastener 154 at hex-shaped roller electrical/communication connector 18. As will be discussed in greater detail later, controller electrical/communication wiring 152 will be used to connect electrical/communication controller 151 to a conventional power source (not shown) and a conventional communication source (not shown) such a Wi-Fi, Internet, motor-driven roller controller or the like.

Figure 7:
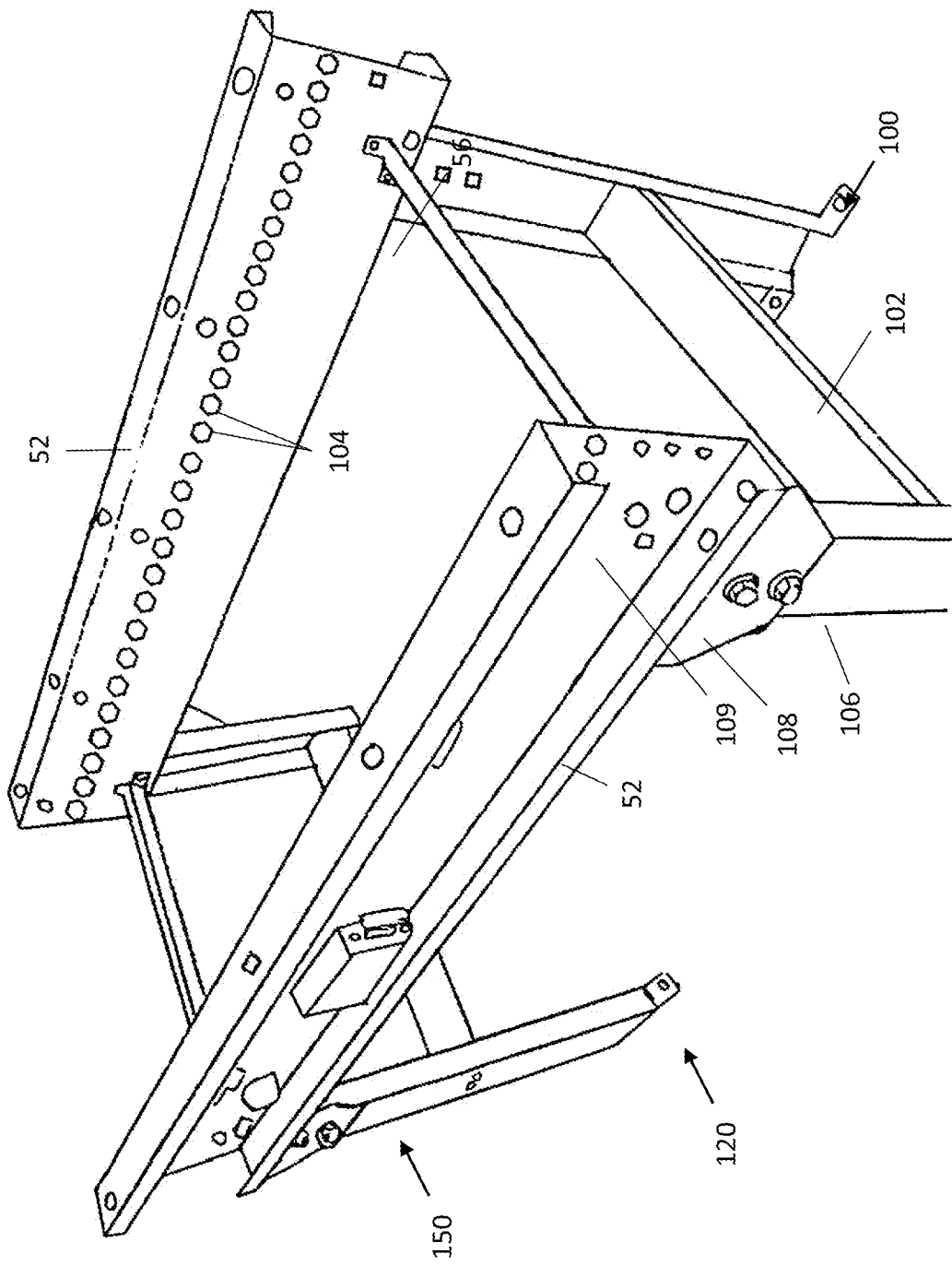
FIG. 7 is an isometric top view of the side (frame) rails and frame stays being attached, according to the present invention.

In order to address the shortcomings of the prior, known methods of constructing conveyor assembly sections, reference is made now to FIG. 7. With respect to FIG. 7, there is illustrated frame assembly 100. Frame assembly 100, includes, in part, side (frame) rails 52, frame stays 56, cross bars 102, frame openings 104, legs 106, and electrical/communication assembly 150. Preferably, side (frame) rails 52, frame stays 56, cross bars 102, and legs 106 are constructed of any suitable, durable, high strength, rust resistant material. It is to be understood that side (frame) rails 52, frame stays 56, and openings 104 will make up the conveyor frame 110 that will be used to construct conveyor assembly section 120. Furthermore, side (frame) rails 52 and frame stays 56 will be constructed in a similar manner as discussed earlier with respect to side (frame) rails 52 and frame stays 56. Also, frame openings 104 will be used to locate rollers on frame rails 52, as discussed above and in greater detail later. Finally, electrical/communication controller assembly 150 will be connected to a motor-driven roller 2 (FIG. 1) in order to provide an electrical and communication connection to the motor-driven roller 2, as will be discussed in greater detail later.

A unique aspect of the present invention is that cross bars 102 and legs 106 are used to assist in the construction of conveyor frame 110. In particular, side frames 52 are conventionally secured to legs 106 by conventional fasteners 108. Cross bars 102 are conventionally secured between legs 106 by conventional fasteners (not shown). Preferably, the length of cross bars 102 should be such that frame stays 56 can be easily and efficiently secured to frame rails 52 by conventional fasteners 109. In this manner, cross bars 102 and legs 106 can be used to properly retain frame rails 52 while frame stays 56 can be securely attached to frame rails 52.

Figure 8:
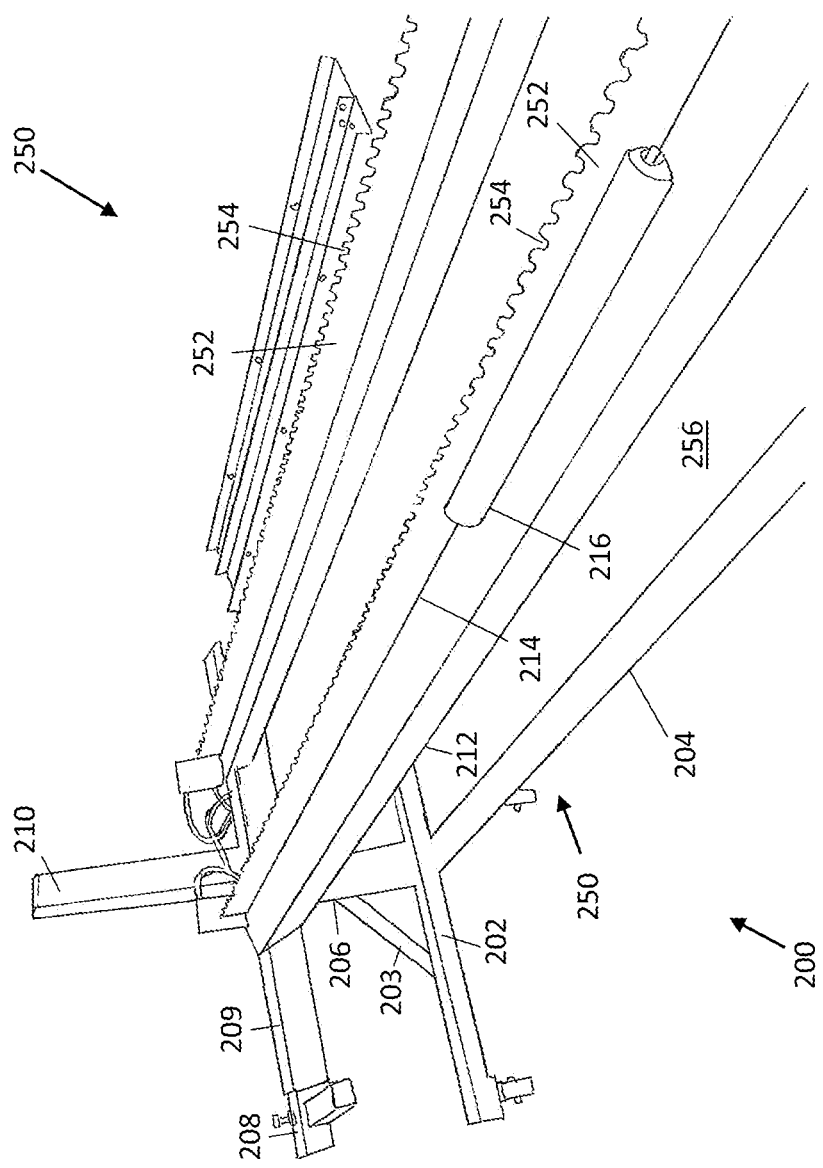
FIG. 8 is an isometric top view of the shaft aligners being located on the jig assembly, according to the present invention.

With respect to FIG. 8, there is illustrated jig assembly 200 and aligner assembly 250. In particular, jig assembly 200, includes, in part, leg supports 202, leg support braces 203, jig extension 204, legs 206, arms 208, arm length adjustors 209, jig height adjustor 210, and aligner retaining arms 212. Preferably, leg supports 202, leg support braces 203, jig extension 204, legs 206, arms 208, and aligner retaining arms 212 are constructed of any suitable, durable, high strength, rust resistant material. It is to be understood that while only one end of jig assembly 200 is illustrated, the other end of jig assembly 200 is constructed in a similar manner. Also, it is to be understood that leg supports 202, leg support braces 203, and jig extension 204 are secured together in order to provide a stable structure (jig assembly) upon which a conveyor assembly section 120 (FIG. 11) can be constructed.

Another unique aspect of the present invention is the use of arm length adjustors 209 and jig height adjustor 210. During the construction of a conveyor assembly section 120, the length of arms 208 can be adjusted through the use of arm length adjustors 209 to accommodate varying widths of the conveyor assembly section 120. It is to be understood that arm length adjustors 209 can be any conventional device that is capable of adjusting the length of arms 208 such as a wheel, a crank, or the like. It is to be further understood that the width of conveyor assembly section 120 can range between 12-48 inches. Furthermore, a height of the aligner assembly 250 with respect to the floor 256 can be adjusted using the jig height adjustor 210. In this manner, a distance between the floor 256 and the aligner assembly 250 can be adjusted to accommodate the person who is using the jig assembly 200.

A further unique aspect of the present invention is the use of aligner assembly 250. As shown in FIG. 8, aligner assembly 250 includes, in part, aligner plates 252 having hex-hole shaped slots 254. Preferably, aligner plates are constructed of any suitable, durable, high strength, rust resistant material. Also, hex-hole shaped slots 254 are formed in aligner plates 252 by conventional forming techniques such as drilling, grinding, molding, or the like. Finally, aligner plates 252 are temporary retained in place on aligner retaining arms 212 through the use of slots 214 and aligner retainer 216. In particular, an aligner plate 252 is located in slot 214. The aligner retainer 216 is firmly located against a side of aligner plate 252. The aligner retainer 216 is then conventionally fastened to aligner retaining arm 212 by conventional fasteners (not shown) in order to retain aligner plates 252 firmly in place on aligner retaining arms 212. It is to be understood that each aligner plate 252 will be held in place through the use of an aligner retainer 216. As will be discussed in greater detail later, aligner assembly 250 can be used in order to eliminate the prior known methods of attaching the frame rails 52 to the frame stays (cross members) 56, inserting the MDR 2 while protecting the motor cable/connection 4 (FIG. 1), all the while trying to make sure that the hex shaped shaft end 14 (FIG. 1) and hex-shaped roller electrical/communication connector 18 both fit into the hex shaped frame openings 104 in frame rails 52, as discussed above.

Figure 9:
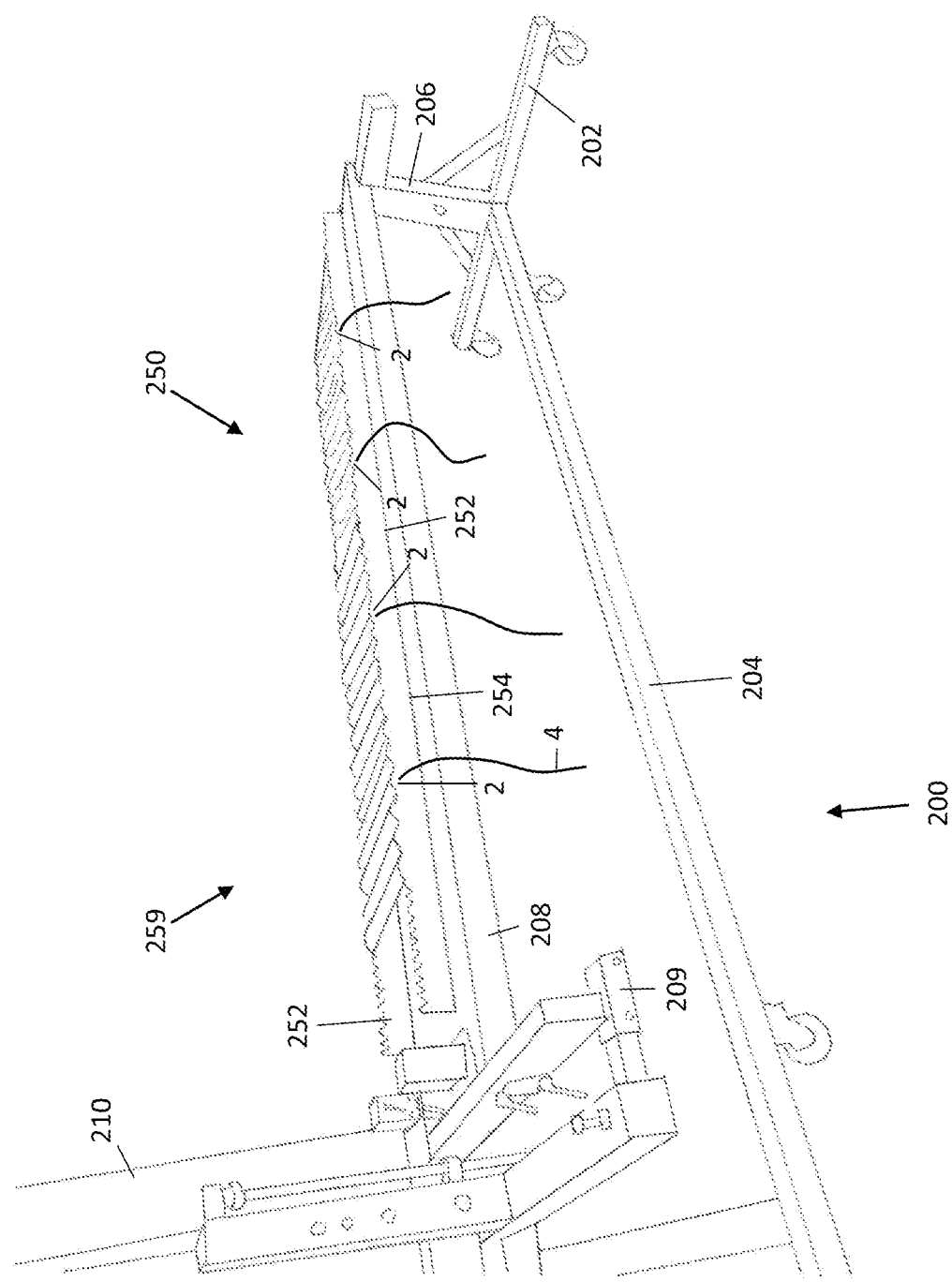
FIG. 9 is an isometric top view of the motor-driven rollers and the idler rollers being placed on the shaft aligners, according to the present invention.
Figure 10:
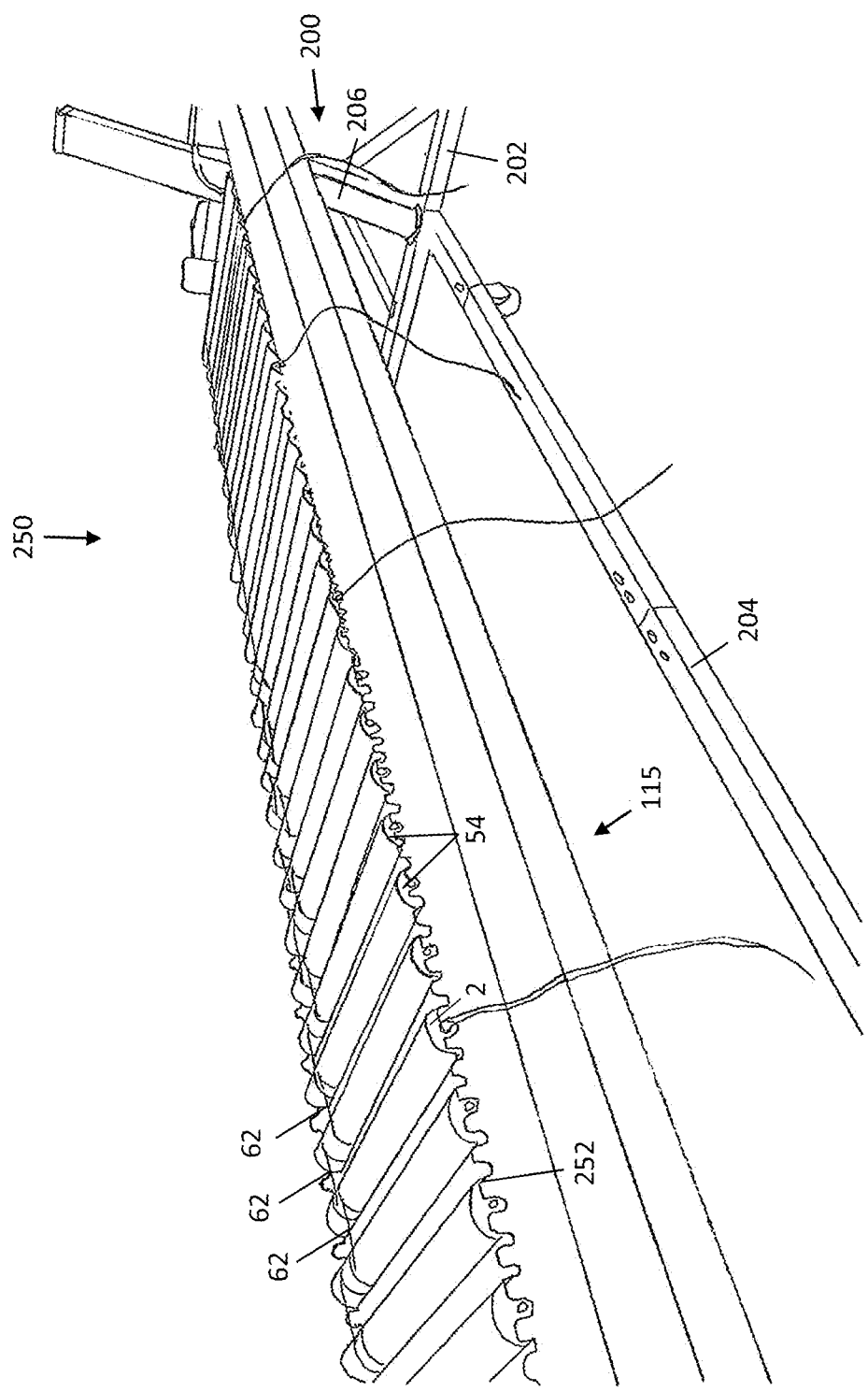
FIG. 10 is another isometric top view of the motor-driven rollers and the idler rollers being placed on the shaft aligners and the electrical connectors to the motor-driven rollers also being illustrated, according to the present invention.

Once the aligner plates 252 have been located on jig assembly 200, as shown in FIGS. 9 and 10, motor-driven rollers 2 and idler rollers 54 are placed in predetermined locations on the aligner plates 252. In particular, as discussed earlier, there are four (4) motor-driven rollers 2 placed on the aligner plates 252. Also, nine (9) idler rollers 54 are located with respect to each motor-driven roller 2. A unique aspect of the present invention is that the hex-hole shaped slots 254 allow for the quick and easy insertion of the motor-driven rollers 2 and the idler rollers 54 into the aligner plates 252. In this manner, the ends of the motor-driven rollers 2 and the idler rollers 54 will be aligned within the openings 104 in frame rails 52 (FIG. 5), as will be discussed in greater detail later. It is to be further understood that a plurality of O-rings 62 is located between the motor-driven roller 2 and the idler rollers 54, as discussed earlier. As discussed earlier, the rotation of the motor-driven roller 2 will cause the other nine (9) idler rollers 54 to rotate in a particular conveyor assembly zone 115.

Figure 11:
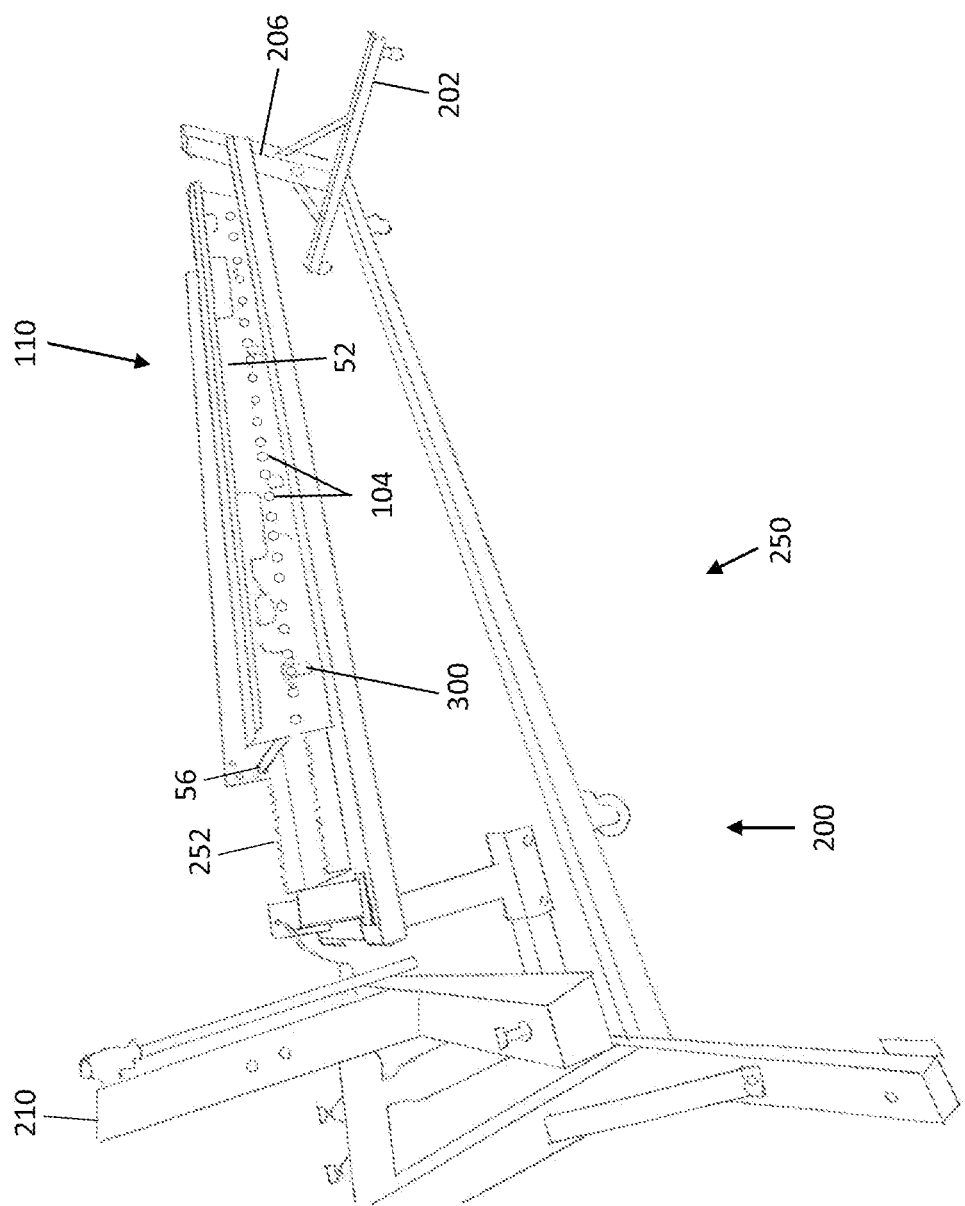
FIG. 11 is an isometric top view of the side (frame) rails and frame stays being located over the motor-driven rollers, the idler rollers, and the shaft aligners, according to the present invention.

After all of the motor-driven rollers 2 and idler rollers 54 have been inserted into aligner plates 252 in their desired locations, as shown in FIG. 11, the conveyor frame 110 is located over the aligner plates 252 and removably attached to the aligner plates 252 through the use of conventional fasteners 300 such as clamps or the like. A further unique aspect of the present invention is that since the ends of the motor-driven rollers 2 and the idler rollers 54 are aligned within the hex-hole shaped slots 254 in aligner plates 252, the openings 104 in frame rails 52 should also align with the hex-hole shaped slots 254. Consequently, the ends of the motor-driven rollers 2 and the idler rollers 54 should align with the openings 104 in frame rails 52 (FIG. 5) which eliminates the time-consuming step of trying to align all of the motor-driven rollers 2 and idler rollers, as discussed earlier. Finally, the fasteners connected to frame stays 56 and frame rails 52 are further tightened so that conveyor frame 110 is loosely retained against the ends of the motor-driven rollers 2 and the idler rollers 54 and the ends of the motor-driven rollers 2 and the idler rollers 54 are located within openings 104 in frame rails 52.

Figure 12:
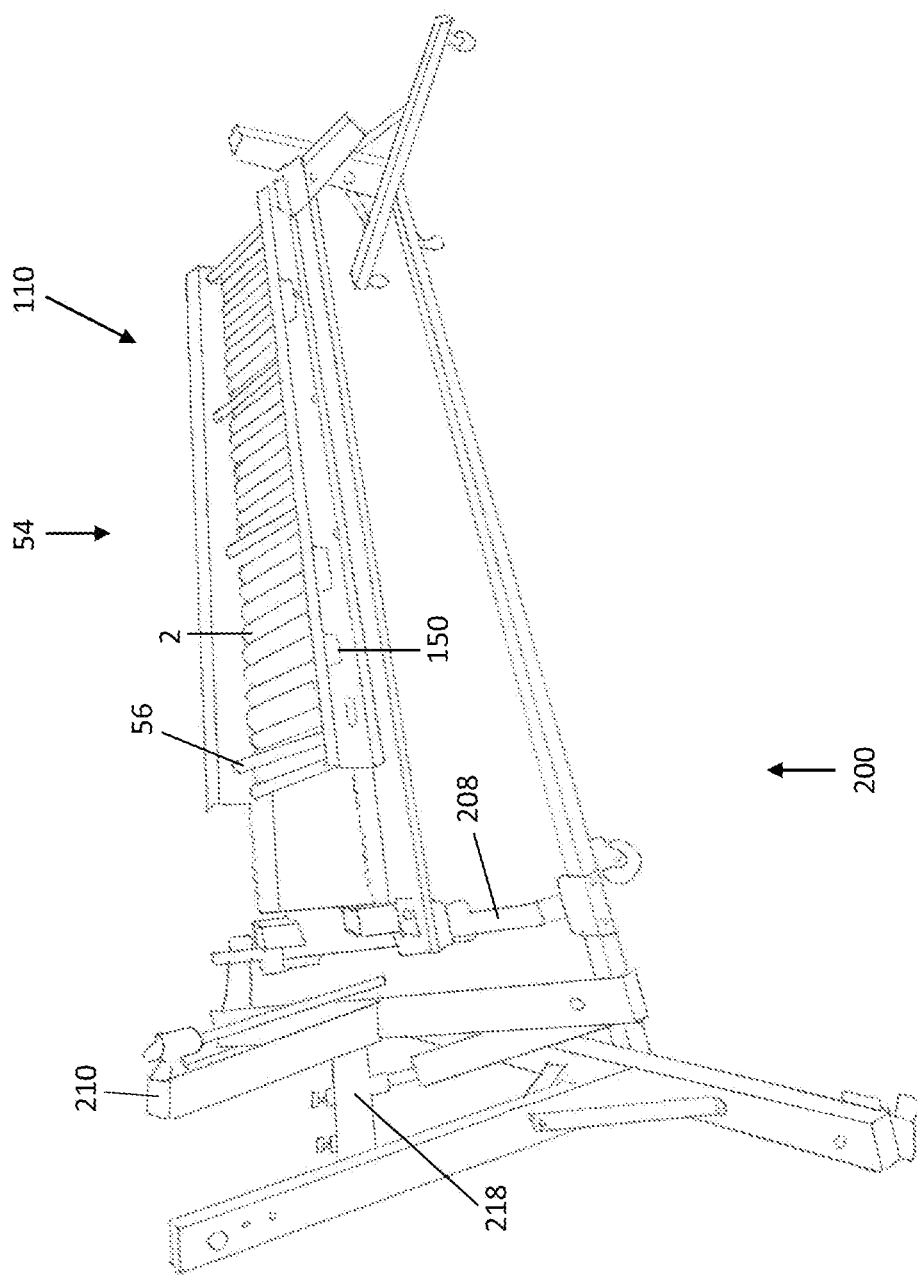
FIG. 12 is an isometric top view of the jig being rotated so that the side (frame) rails, the frame stays, the motor-driven rollers, and the idler rollers are removed from the shaft aligners, according to the present invention.

Regarding FIG. 12, conveyor frame 110 is firmly retained against aligner plates 252. Also, as shown in FIG. 12, arms 208 are rotated around axle 218 on jig assembly 200. As can be seen in FIG. 12, as arms 208 are rotated, conveyor frame 110, as well as, motor-driven rollers 2 and idler rollers 54 are released from aligner plates 252. A unique aspect of the present invention is that the aligner plates 252 can be used to align the ends of the motor-driven rollers 2 and the idler rollers 54 within openings 104 in frame rails 52 in a quick and easy manner. Also, the aligner plates 252 can be easily removed from the conveyor frame 110 and the ends of the motor-driven rollers 2 and the idler rollers 54 so that another conveyor assembly section 120 can be quickly and easily constructed.

Figure 13:
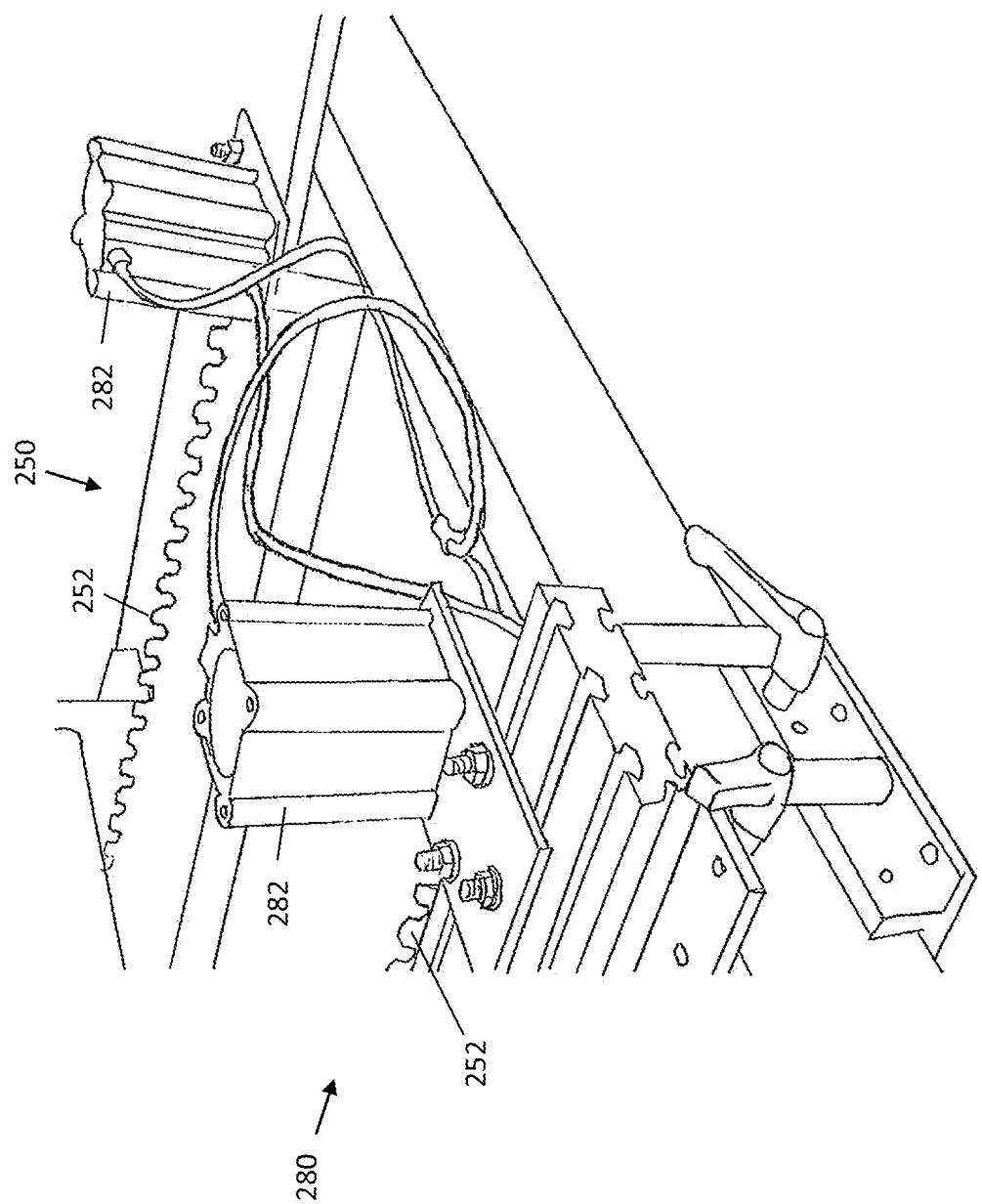
FIG. 13 is an isometric top view of the shaft aligner lifting/lowering assembly, according to the present invention.

With respect to FIG. 13, there is illustrated shaft aligner lifting/lowering assembly 280. Shaft aligner lifting/lowering assembly 280 includes, in part, conventional pneumatic cylinders 282. It is to be understood that pneumatic cylinders 282 are conventionally connected to aligner plates 252. It is to be further understood that while only one (1) shaft aligner lifting/lowering assembly 280 is connected to the aligner plate 252, there is another shaft aligner lifting/lowering assembly 280 connected at the other end of each of the aligner plates 252. A unique aspect of the present invention is that pneumatic cylinders 282 can be used to raise and lower aligner plates 252.

Figure 14:
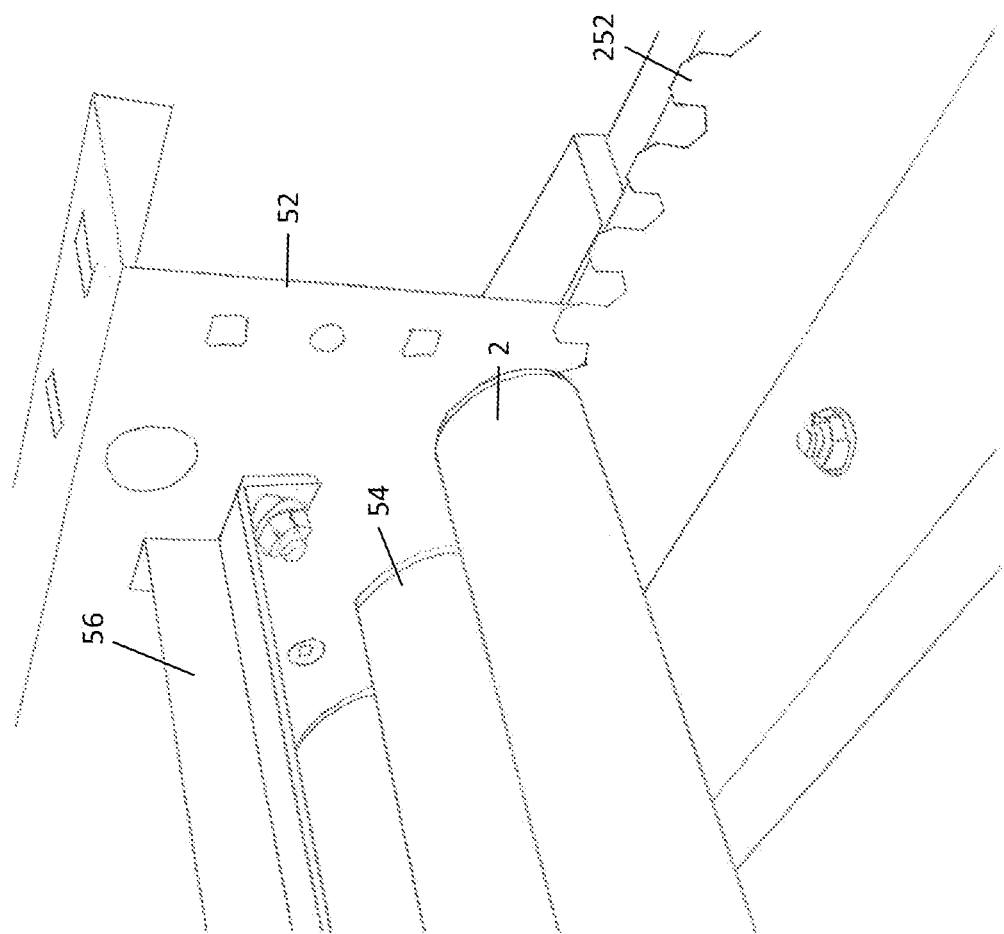
FIG. 14 is an isometric top view of the shaft aligner being lifted upwards towards the motor-driven rollers and the idler rollers, according to the present invention.

Regarding FIG. 14, the aligner plates 252 are raised or extended as the motor-driven rollers 2 and the idler rollers 54 are being placed into the aligner plates 252 and the conveyor frame rails 52 are "loosely" held in place by the frame stays 56.

Figure 15:
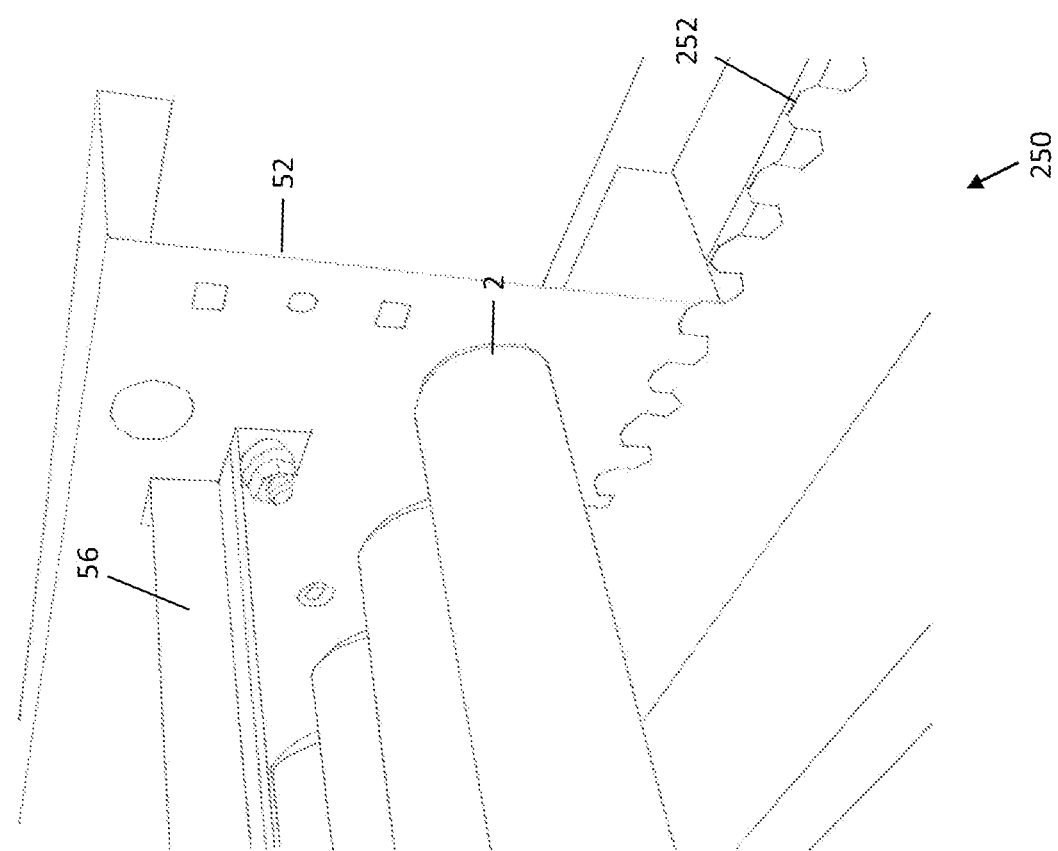
FIG. 15 is an isometric top view of the shaft aligner being lowered away from the motor-driven rollers and the idler rollers, according to the present invention.

As shown in FIG. 15, once the hex shafts of the motor-driven rollers 2 and the idler rollers 54 make it through the frame rails 52, the aligner plates 252 are retracted or lowered.

With respect to FIG. 16, the frame stays 56 can be fully tightened so that the conveyor assembly section 120 is secure before rotating to right-side up, as discussed below.

Figure 17:
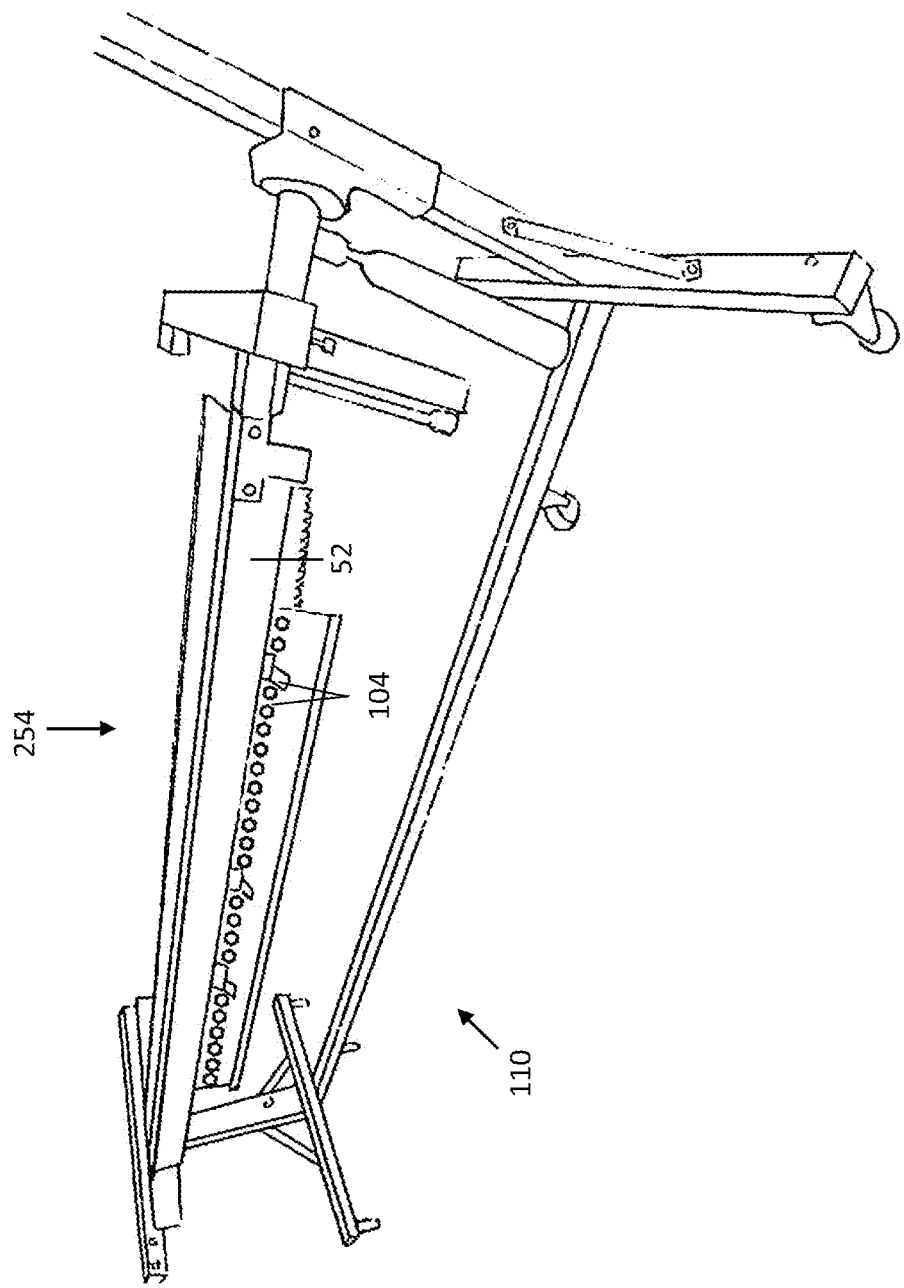
FIG. 17 is an isometric top view of the jig being completely rotated so that the side (frame) rails, the frame stays, the motor-driven rollers, the idler rollers, and the shaft aligners are removed from the jig, according to the present invention.

With respect to FIG. 17, the conveyor frame 110 has been completely rotated so that the conveyor frame 110 and the ends of the motor-driven rollers 2 and the idler rollers 54 have been completely removed from aligner plates 252. It is to be understood that once the conveyor frame 110 and the ends of the motor-driven rollers 2 and the idler rollers 54 have been completely removed from aligner plates 252, the fasteners connecting the various parts of the conveyor frame 110 and the fasteners connecting the motor-driven rollers 2 and the idler rollers 54 to the frame rails 52 are further tightened so that the conveyor frame 110 is securely connected to the motor-driven rollers 2 and the idler rollers 54 and the ends of the motor-driven rollers 2 and the idler rollers 54 are retained within openings 104 in frame rails 52. Furthermore, as shown in FIG. 13, the controller electrical/communication wiring 152 can be used to connect electrical/communication source 150 (FIG. 7) to a conventional power source (not shown) and a conventional communication source (not shown) such a Wi-Fi, Internet, motor-driven roller controller or the like.

Figure 18:
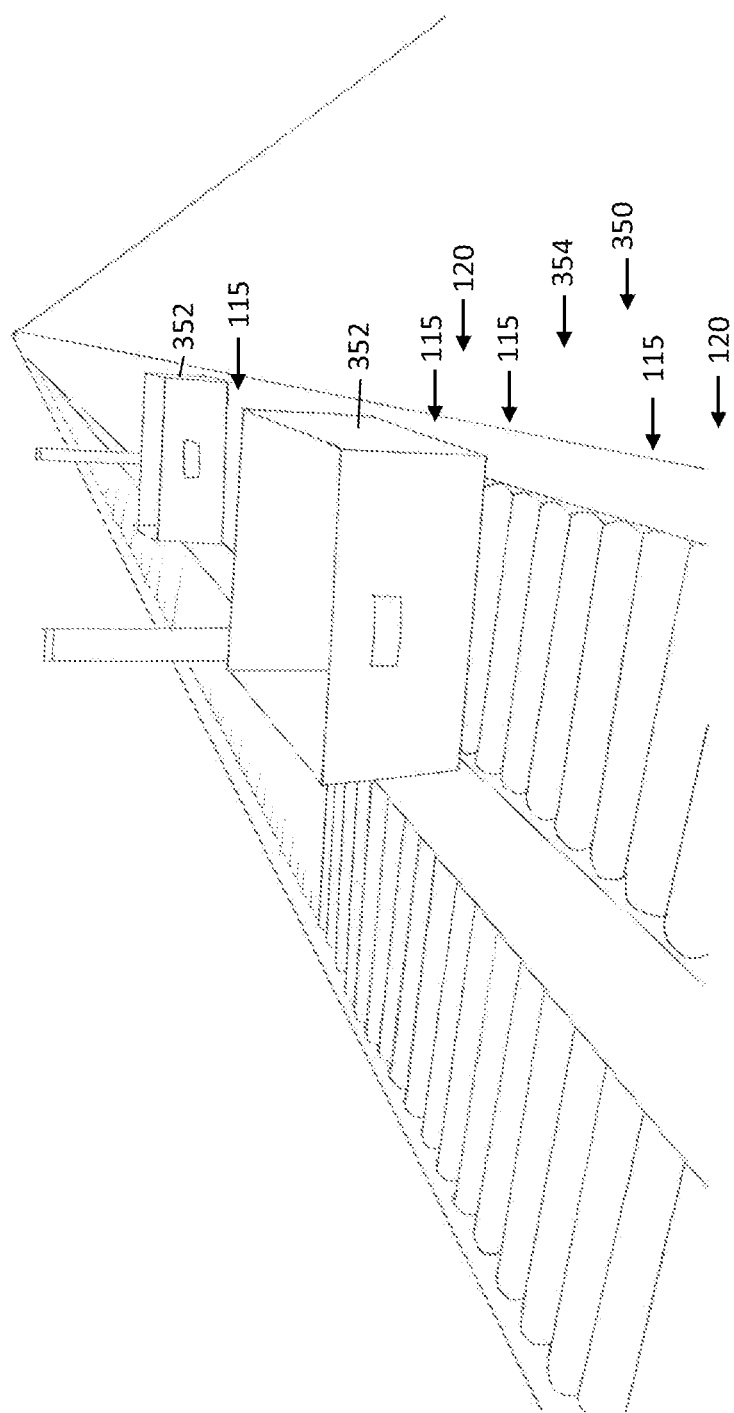
FIG. 18 is an isometric top view of a conveyor system with a plurality of conveyor assembly sections being connected together, constructed according to the present invention.

Regarding FIG. 18, there is shown a conveyor assembly 350 that includes a plurality of conveyor assembly sections 120. A unique aspect of the present invention is that since each conveyor assembly section 120 includes four (4) conveyor assembly zones 115 which further includes a plurality of motor-driven rollers (FIG. 2). In this manner, the motor-driven roller 2 in each conveyor assembly zone 115 can be independently controlled in order to transport a container 352 along the conveyor assembly zone 115 and consequently, each conveyor assembly section 120. It is to be understood that each conveyor assembly section 120 can also be equipped with sensors 35 such as optical sensors that are capable of sensing when a container 352 is at a specific conveyor section 120 or on a specific part of a conveyor assembly section 120. Furthermore, these sensors may also be able to read bar codes (not shown) on the containers 352 to identify each specific container 352 and its location on a conveyor section 120. Finally, it is to be understood that a conventional control network such as an ether-based communications network can be utilized within the facility that is using the plurality of conveyor assembly sections 120 such as a warehouse such that the control network can be conventionally connected to each of the conveyor assembly sections 120 in order to control the transfer of container 352 through the facility.

Construction of a Conveyor Assembly Zone

During the construction of a conveyor assembly section 120, attention is directed to FIGS. 7-18. Initially, the conveyor frame 110 is constructed by attaching the frame rails 53 to the frame stays 56 (FIG. 7).

After the frame rails 53 are attached to the frame stays 56, the aligner plates 252 are temporary retained in place on aligner retaining arms 212 through the use of slots 214 and aligner retainers 216. In particular, each aligner plate 252 is located in slot 214 (FIG. 8). The aligner retainers 216 are then firmly located against each aligner plate 252. The aligner retainers 216 are then conventionally fastened to aligner retaining arms 212 by conventional fasteners (not shown).

Once the aligner plates 252 are temporary retained in place on aligner retaining arms 212, the motor-driven rollers 2 and the idler rollers 54 are placed in predetermined locations on the aligner plates 252 (FIG. 9). In particular, as discussed earlier, there are four (4) motor-driven rollers 2 placed on the aligner plates 252. Also, nine (9) idler rollers 54 are located with respect to each motor-driven roller 2. As discussed earlier, the ends of the motor-driven rollers 2 and the idler rollers 54 will be aligned within the hex-hole shaped slots 254 in aligner plates 252. Also, a plurality of O-rings 62 is located between motor-driven rollers 2 and the idler rollers 54 (FIGS. 2 and 10), as discussed earlier.

After all of the motor-driven rollers 2 and idler rollers 54 have been inserted into aligner plates 252 in their desired locations, as shown in FIG. 11, the conveyor frame 110 is located over the aligner plates 252 and removably attached to the aligner plates 252 through the use of conventional fasteners 300 such as clamps or the like. As discussed earlier, since the ends of the motor-driven rollers 2 and the idler rollers 54 are aligned within the hex-hole shaped slots 254 in aligner plates 252, the openings 104 in frame rails 52 should also align with the hex-hole shaped slots 254. Consequently, the ends of the motor-driven rollers 2 and the idler rollers 54 should align with the openings 104 in frame rails 52, as discussed earlier. Finally, the fasteners connected to frame stays 56 and frame rails 52 are further tightened so that conveyor frame 110 is loosely retained against the ends of the motor-driven rollers 2 and the idler rollers 54 and the ends of the motor-driven rollers 2 and the idler rollers 54 are located within openings 104 in frame rails 52.

After the fasteners connected to frame stays 56 and frame rails 52 are further tightened so that conveyor frame 110 is loosely retained against aligner plates 252 and the ends of the motor-driven rollers 2 and the idler rollers 54 are located within openings 104 in frame rails 52, arms 208 are rotated around axle 218 on jig assembly 200 (FIG. 12). As can be seen in FIG. 12, as arms 208 are rotated, conveyor frame 110, as well as, motor-driven rollers 2 and idler rollers 54 are released from aligner plates 252. In this manner, the aligner plates 252 can be easily removed from the conveyor frame 110 and the ends of the motor-driven rollers 2 and the idler rollers 54 so that another conveyor section 120 can be quickly and easily constructed.

Figure 16:
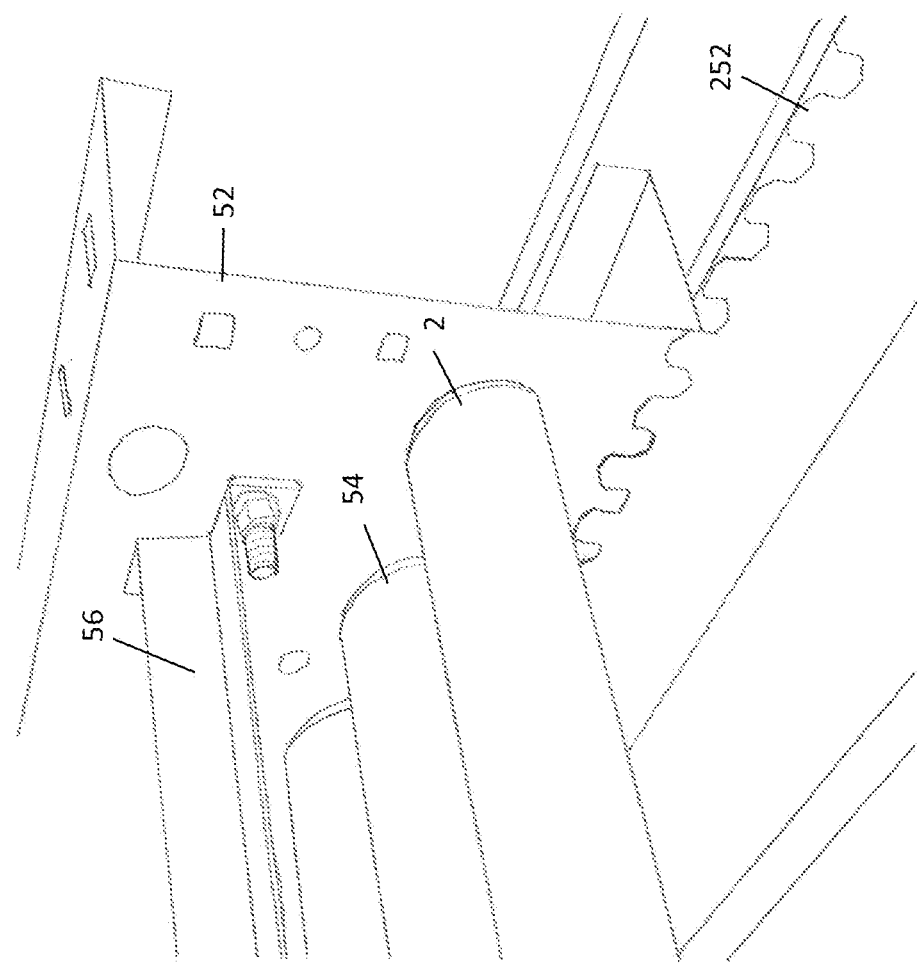
FIG. 16 is an isometric top view showing the frame stays after they are fully tightened, according to the present invention.

As shown in FIG. 13-16, the aligner plates 252 are raised or extended as the motor-driven rollers 2 and the idler rollers 54 are being placed into the aligner plates 252 and the conveyor frame rails 52 are "loosely" held in place by the frame stays 56 (FIG. 14). Once the hex shafts of the motor-driven rollers 2 and the idler rollers 54 make it through the frame rails 52, the aligner plates 252 are retracted or lowered (FIG. 15). The frame stays 56 can be fully tightened so that the conveyor assembly section 120 is secure before rotating to right-side up, as discussed below (FIG. 16).

The conveyor frame 110 is then completely rotated so that the conveyor frame 110 and the ends of the motor-driven rollers 2 and the idler rollers 54 have been completely removed from aligner plates 252. It is to be understood that once the conveyor frame 110 and the ends of the motor-driven rollers 2 and the idler rollers 54 have been completely removed from aligner plates 252, the fasteners connecting the various parts of the conveyor frame 110 and the fasteners connecting the motor-driven rollers 2 and the idler rollers 54 to the frame rails 52 are further tightened so that the conveyor frame 110 is securely connected to the motor-driven rollers 2 and the idler rollers 54 and the ends of the motor-driven rollers 2 and the idler rollers 54 are retained within openings 104.

Finally, the controller electrical/communication wiring 152 can be used to connect electrical/communication controller assembly 150 (FIG. 7) to a conventional power source (not shown) and a conventional communication source (not shown) such a Wi-Fi, Internet, motor-driven roller controller or the like.

The preceding merely illustrates the principles of the invention. It will thus be appreciated that those skilled in the art will be able to devise various arrangements which, although not explicitly described or shown herein, embody the principles of the invention and are included within its spirit and scope. Furthermore, all examples and conditional language recited herein are principally intended expressly to be only for pedagogical purposes and to aid the reader in understanding the principles of the invention and the concepts contributed by the inventors to furthering the art and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents and equivalents developed in the future, i.e., any elements developed that perform the same function, regardless of structure.

This description of the exemplary embodiments is intended to be read in connection with the figures of the accompanying drawing, which are to be considered part of the entire written description. In the description, relative terms such as "lower," "upper," "horizontal," "vertical," "above," "below," "up," "down," "top" and "bottom" as well as derivatives thereof (e.g., "horizontally," "downwardly," "upwardly," etc.) should be construed to refer to the orientation as then described or as shown in the drawing under discussion. These relative terms are for convenience of description and do not require that the apparatus be constructed or operated in a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise.

All patents, publications, scientific articles, web sites, and other documents and materials referenced or mentioned herein are indicative of the levels of skill of those skilled in the art to which the invention pertains, and each such referenced document and material is hereby incorporated by reference to the same extent as if it had been incorporated by reference in its entirety individually or set forth herein in its entirety.

The applicant reserves the right to physically incorporate into this specification any and all materials and information from any such patents, publications, scientific articles, web sites, electronically available information, and other referenced materials or documents to the extent such incorporated materials and information are not inconsistent with the description herein.

The written description portion of this patent includes all claims. Furthermore, all claims, including all original claims as well as all claims from any and all priority documents, are hereby incorporated by reference in their entirety into the written description portion of the specification, and Applicant reserves the right to physically incorporate into the written description or any other portion of the application, any and all such claims. Thus, for example, under no circumstances may the patent be interpreted as allegedly not providing a written description for a claim on the assertion that the precise wording of the claim is not specifically set forth in the written description portion of the patent.

The claims will be interpreted according to law. However, and notwithstanding the alleged or perceived ease or difficulty of interpreting any claim or portion thereof, under no circumstances may any adjustment or amendment of a claim or any portion thereof during prosecution of the application or applications leading to this patent be interpreted as having forfeited any right to any and all equivalents thereof that do not form a part of the prior art.

All of the features disclosed in this specification may be combined in any combination. Thus, unless expressly stated otherwise, each feature disclosed is only an example of a generic series of equivalent or similar features.

It is to be understood that while the invention has been described in conjunction with the detailed description thereof, the foregoing description is intended to illustrate and not limit the scope of the invention, which is defined by the scope of the appended claims. Thus, from the foregoing, it will be appreciated that, although specific embodiments of the invention have been described herein for the purpose of illustration, various modifications may be made without deviating from the spirit and scope of the invention. Other aspects, advantages, and modifications are within the scope of the following claims and the present invention is not limited except as by the appended claims.

The specific methods and compositions described herein are representative of preferred embodiments and are exemplary and not intended as limitations on the scope of the invention. Other objects, aspects, and embodiments will occur to those skilled in the art upon consideration of this specification and are encompassed within the spirit of the invention as defined by the scope of the claims. It will be readily apparent to one skilled in the art that varying substitutions and modifications may be made to the invention disclosed herein without departing from the scope and spirit of the invention. The invention illustratively described herein suitably may be practiced in the absence of any element or elements, or limitation or limitations, which is not specifically disclosed herein as essential. Thus, for example, in each instance herein, in embodiments or examples of the present invention, the terms "comprising", "including", "containing", etc. are to be read expansively and without limitation. The methods and processes illustratively described herein suitably may be practiced in differing orders of steps and are not necessarily restricted to the orders of steps indicated herein or in the claims.

The terms and expressions that have been employed are used as terms of description and not of limitation, and there is no intent in the use of such terms and expressions to exclude any equivalent of the features shown and described or portions thereof, but it is recognized that various modifications are possible within the scope of the invention as claimed. Thus, it will be understood that although the present invention has been specifically disclosed by various embodiments and/or preferred embodiments and optional features, any and all modifications and variations of the concepts herein disclosed that may be resorted to by those skilled in the art are considered to be within the scope of this invention as defined by the appended claims.

The invention has been described broadly and generically herein. Each of the narrower species and sub-generic groupings falling within the generic disclosure also form part of the invention. This includes the generic description of the invention with a proviso or negative limitation removing any subject matter from the genus, regardless of whether or not the excised material is specifically recited herein.

It is also to be understood that as used herein and in the appended claims, the singular forms "a," "an," and "the" include plural reference unless the context clearly dictates otherwise, the term "X and/or Y" means "X" or "Y" or both "X" and "Y", and the letter "s" following a noun designates both the plural and singular forms of that noun. In addition, where features or aspects of the invention are described in terms of Markush groups, it is intended and those skilled in the art will recognize, that the invention embraces and is also thereby described in terms of any individual member or subgroup of members of the Markush group.

Other embodiments are within the following claims. Therefore, the patent may not be interpreted to be limited to the specific examples or embodiments or methods specifically and/or expressly disclosed herein. Under no circumstances may the patent be interpreted to be limited by any statement made by any Examiner or any other official or employee of the Patent and Trademark Office unless such statement is specifically and without qualification or reservation expressly adopted in a responsive writing by Applicants.

Although the invention has been described in terms of exemplary embodiments, it is not limited thereto. Rather, the appended claims should be construed broadly, to include other variants and embodiments of the invention, which may be made by those skilled in the art without departing from the scope and range of equivalents of the invention.

Other modifications and implementations will occur to those skilled in the art without departing from the spirit and the scope of the invention as claimed. Accordingly, the description herein above is not intended to limit the invention, except as indicated in the appended claims.

Therefore, provided herein is a new and improved jig for use in constructing conveyor assemblies. The preferred jig for use in constructing conveyor assemblies, according to various embodiments of the present invention, offers the following advantages: ease of use; decreased time to construct a conveyor assembly section; decreased time to construct a conveyor zone; ease of aligning the idler rollers in the side (frame) rails; ease of aligning the motor-driven roller in the side (frame) rails; ease of connecting the motor-driven roller to a plurality of idler rollers; ease of electrically connecting the power source to the motor-driven roller; the ability to connect the motor-driven roller to a communication system; and the ability to independently control conveyor assembly zones.

In fact, in many of the preferred embodiments, these advantages of ease of use, decreased time to construct a conveyor assembly section, decreased time to construct a conveyor zone, ease of aligning the idler rollers in the side (frame) rails, ease of aligning the motor-driven roller in the side (frame) rails, ease of connecting the motor-driven roller to a plurality of idler rollers, ease of electrically connecting the power source to the motor-driven roller, the ability to connect the motor-driven roller to a communication system, and the ability to independently control conveyor assembly zones are optimized to an extent that is considerably higher than heretofore achieved in prior, known methods of constructing conveyor assemblies.

I claim:

1. A roller conveyor assembly construction system, comprising:
   a rotatable jig assembly;
   a plurality of aligner plates, wherein each of the plurality of aligner plates is operatively connected to the jig assembly;
   a plurality of rollers located on each of the plurality of aligner plates; and
   a frame assembly operatively connected to the plurality of rollers, wherein the frame assembly is removably connected to each of the plurality of aligner plates.

2. The roller conveyor assembly construction system, according to claim 1, wherein the rotatable jig assembly is further comprised of:
   a plurality of leg supports;
   a plurality of leg support braces, wherein each of the plurality of leg support braces is operatively connected to each of the plurality of leg supports;
   a jig extension operatively connected to each of the plurality of leg supports;
   a plurality of legs operatively connected to each of the plurality of leg supports and the jig extension;
   a rotatable axle operatively connected to the plurality of legs;
   a plurality of rotatable arms, wherein each of the plurality of rotatable arms is operatively connected to the rotatable axle; and
   a plurality of aligner retaining arms, wherein each of the plurality of aligner retaining arms is operatively connected to each of the plurality of arms and wherein each of the plurality of aligner retaining arms includes a plurality of slots located along a length of each of the plurality of aligner retaining arms.

3. The roller conveyor assembly construction system, according to claim 2, wherein the rotatable jig assembly is further comprised of:
a plurality of arm length adjustors operatively connected to each of the plurality of arms; and
a plurality of jig height adjustors, wherein each of the plurality of jig height adjustors is operatively connected to each of the plurality of legs.

4. The roller conveyor assembly construction system, according to claim 2, wherein the rotatable jig assembly is further comprised of:
a plurality of aligner retainers, wherein each of the plurality of aligner retainers is operatively connected to one of the plurality of slots.

5. The roller conveyor assembly construction system, according to claim 2, wherein each of the plurality of aligner assemblies is further comprised of:
a plurality of aligner plates, wherein each of the aligner plates is located within one of the plurality of slots;
a plurality of hex-hole shaped slots located along a length of each of the plurality of aligner plates; and
a plurality of shaft aligner lifting/lowering assemblies operatively connected to each of the plurality of aligner plates.

6. The roller conveyor assembly construction system, according to claim 1, wherein the plurality of rollers is further comprised of:
a plurality of motor-driven rollers; and
a plurality of idler rollers located adjacent to each of the plurality of motor-driven rollers.

7. The roller conveyor assembly construction system, according to claim 1, wherein the frame assembly is further comprised of:
a plurality of frame rails;
a plurality of frame stays, wherein each of the plurality of frame stays is operatively connected to each of the plurality of frame rails; and
a plurality of hex-shaped openings located along a length of each of the plurality of frame rails.

8. A method of constructing a roller conveyor assembly, comprising the steps of:
providing a rotatable jig assembly;
removably attaching a plurality of aligner plates to the jig assembly;
placing a plurality of rollers on each of the plurality of aligner plates; and
attaching a frame assembly to the plurality of rollers to form a roller conveyor assembly.

9. The method of constructing a roller conveyor assembly, according to claim 8, wherein the step of providing the rotatable jig assembly is further comprised of:
providing a plurality of leg supports;
attaching a plurality of leg support braces to each of the plurality of leg supports;
attaching a jig extension to each of the plurality of leg supports;
attaching a plurality of legs to each of the plurality of leg supports;
attaching a rotatable axle to the plurality of legs;
attaching a plurality of rotatable arms to the rotatable axle; and
attaching a plurality of aligner retaining arms to each of the plurality of arms, wherein each of the plurality of aligner retaining arms includes a plurality of slots located along a length of each of the plurality of aligner retaining arms.

10. The method of constructing a roller conveyor assembly, according to claim 9, wherein the step of providing the rotatable jig assembly is further comprised of:
attaching a plurality of arm length adjustors to each of the plurality of arms; and
attaching a plurality of jig height adjustors to each of the plurality of legs.

11. The method of constructing a roller conveyor assembly, according to claim 9, wherein the step of providing the rotatable jig assembly is further comprised of:
removably attaching each of a plurality of aligner retainers to each of the plurality of slots.

12. The method of constructing a roller conveyor assembly, according to claim 11, wherein the step of removably attaching a plurality of aligner assemblies to the jig assembly is further comprised of:
placing a plurality of aligner plates within one of the plurality of slots;
providing a plurality of hex-hole shaped slots located along a length of each of the plurality of aligner plates; and
removably attaching each of the plurality of aligner retainers to each of the plurality of aligner plates.

13. The method of constructing a roller conveyor assembly, according to claim 12, wherein the step of placing a plurality of rollers on each of the plurality of aligner assemblies is further comprised of:
raising the plurality of aligner plates;
placing a plurality of motor-driven rollers on the plurality of aligner plates, wherein each of the plurality of motor-driven rollers is located within one of the plurality of hex-hole shaped slots; and
placing a plurality of idler rollers on the plurality of aligner plates, wherein each of the plurality of idler rollers is located within one of the plurality of hex-hole shaped slots, and wherein a predetermined number of the plurality of idler rollers are located adjacent to each of the plurality of motor-driven rollers.

14. The method of constructing a roller conveyor assembly, according to claim 8, wherein the step of attaching a frame assembly to the plurality of rollers is further comprised of:
providing a plurality of frame rails;
attaching a plurality of frame stays to each of the plurality of frame rails; and
providing a plurality of hex-shaped openings along a length of each of the plurality of frame rails.

15. The method of constructing a roller conveyor assembly, according to claim 13, wherein the method is further comprised of:
locating the frame assembly over the plurality of rollers and the plurality of aligner assemblies;
removably attaching the frame assembly to each of the plurality of aligner assemblies; and
lowering the plurality of aligner plates.

16. The method of constructing a roller conveyor assembly, according to claim 15, wherein the method is further comprised of:
rotating the plurality of rotatable arms such that the plurality of aligner assemblies is separated from the frame assembly and the plurality of rollers; and
securing the plurality of rollers to the frame assembly.

17. An apparatus for constructing a motor-driven roller and idler roller conveyor section, comprising:
- a rotatable jig assembly;
- a plurality of aligner plates, wherein each of the plurality of aligner plates is operatively connected to the jig assembly;
- a plurality of motor-driven rollers and idler rollers located on each of the plurality of aligner plates; and
- a frame assembly operatively connected to the plurality of motor-driven rollers and idler rollers, wherein the frame assembly is removably connected to each of the plurality of aligner plates.

18. The apparatus, according to claim 17, wherein the rotatable jig assembly is further comprised of:
- a plurality of leg supports;
- a plurality of leg support braces, wherein each of the plurality of leg support braces is operatively connected to each of the plurality of leg supports;
- a jig extension operatively connected to each of the plurality of leg supports;
- a plurality of legs operatively connected to each of the plurality of leg supports;
- a rotatable axle operatively connected to the plurality of legs;
- a plurality of rotatable arms, wherein each of the plurality of rotatable arms is operatively connected to the rotatable axle;
- a plurality of aligner retaining arms, wherein each of the plurality of aligner retaining arms is operatively connected to each of the plurality of arms and wherein each of the plurality of aligner retaining arms includes a plurality of slots located a length of each of the plurality of aligner retaining arms; and
- a plurality of aligner retainers, wherein each of the plurality of aligner retainers is operatively connected to one of the plurality of slots.

19. The apparatus, according to claim 18, wherein each of the plurality of aligner assemblies is further comprised of:
- a plurality of aligner plates, wherein each of the aligner plates is located within one of the plurality of slots;
- a plurality of hex-hole shaped slots located along a length of each of the plurality of aligner plates; and
- a plurality of shaft aligner lifting/lowering assemblies operatively connected to each of the plurality of aligner plates.

20. The apparatus, according to claim 17, wherein the frame assembly is further comprised of:
- a plurality of frame rails;
- a plurality of frame stays, wherein each of the plurality of frame stays is operatively connected to each of the plurality of frame rails; and
- a plurality of hex-shaped openings located along a length of each of the plurality of frame rails.

\* \* \* \* \*